July 21, 1970   N. H. ERIKSSON   3,521,498

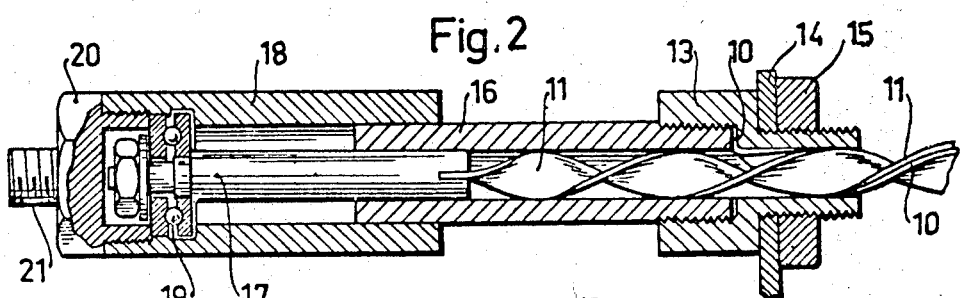
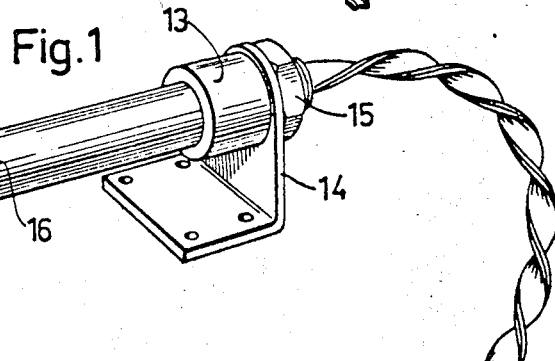
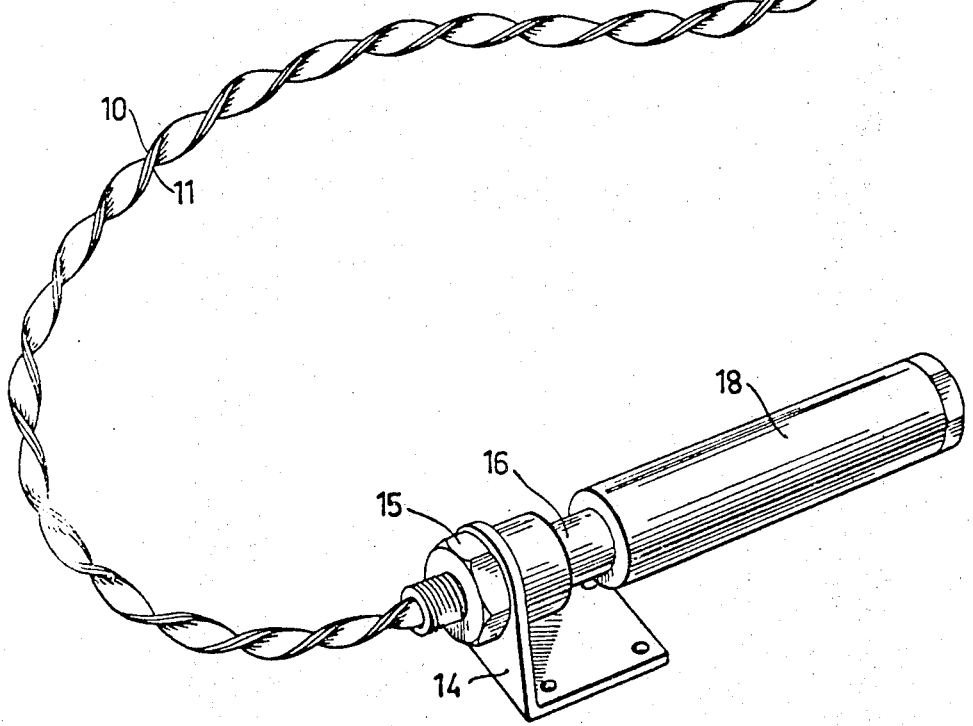

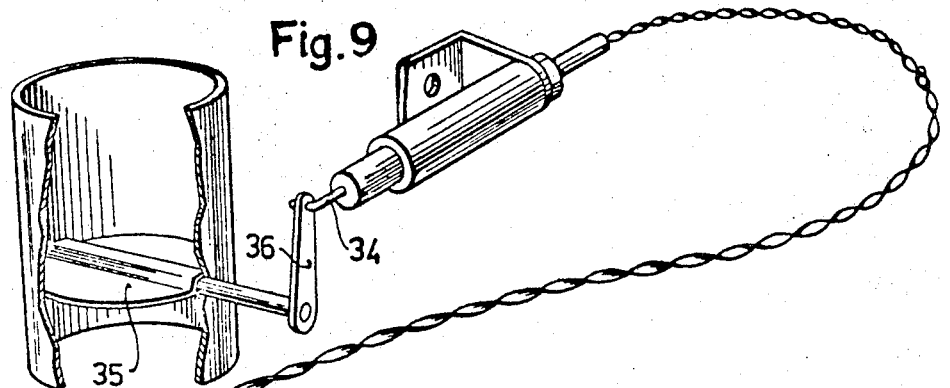
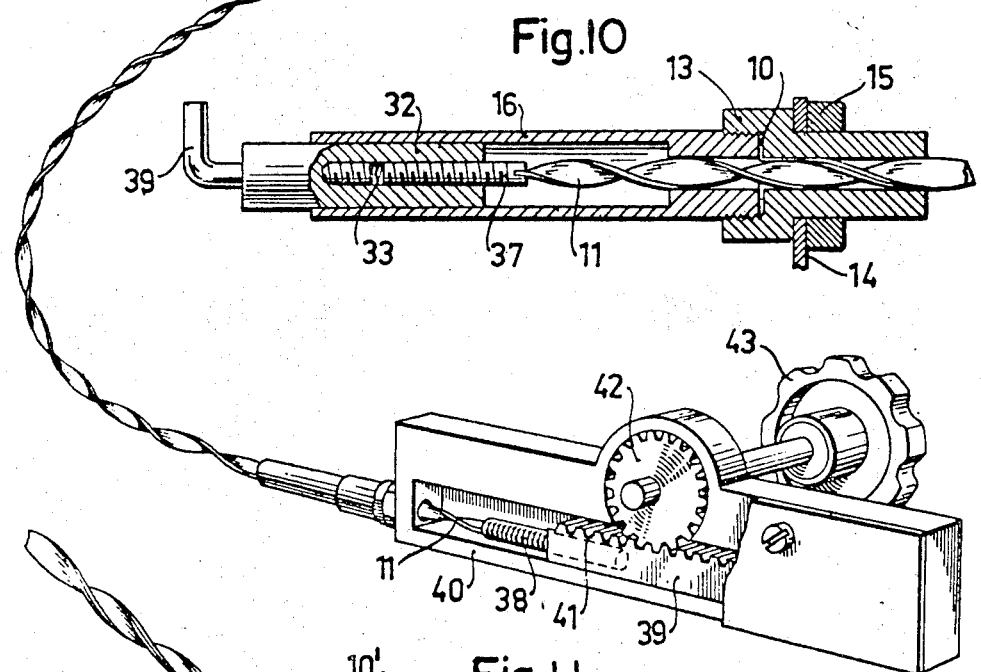
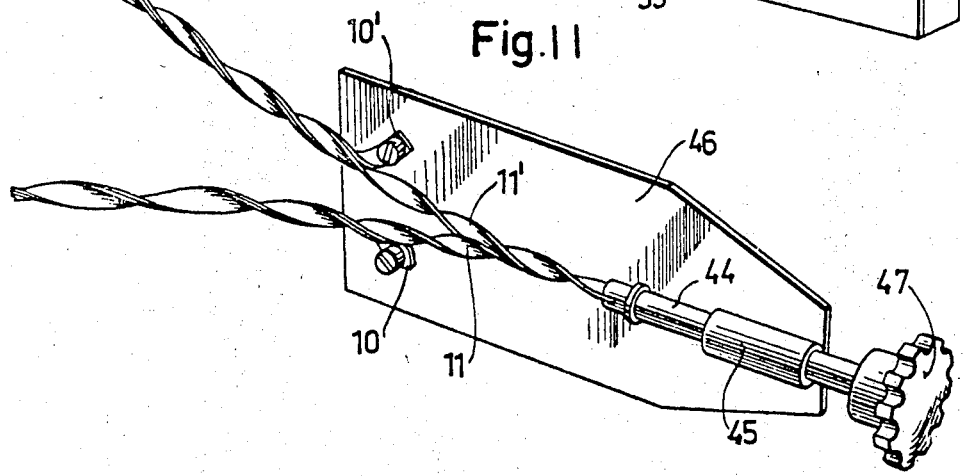

CONTROL CABLE

Filed Sept. 5, 1968   4 Sheets-Sheet 4

United States Patent Office 3,521,498
Patented July 21, 1970

3,521,498
CONTROL CABLE
Nils Holger Eriksson, Solna, Sweden, assignor to Etablissement de Machines Industrielles, Vaduz, Liechtenstein, a corporation of Liechtenstein
Filed Sept. 5, 1968, Ser. No. 757,621
Claims priority, application Sweden, Sept. 11, 1967, 12,529/67
Int. Cl. F16h *21/50;* F16c *1/20*
U.S. Cl. 74—66
17 Claims

ABSTRACT OF THE DISCLOSURE

The invention relates to a flexible control cable for the mechanical operation of members that are located at a distance from the place of operation. The control cable consists of a pair of strips which are helically wound together, one of which, the guide strip, is adapted to be fixed axially at both ends, and the other of which, the control strip, extends at both ends beyond the guide strip and is adapted to be displaced axially, the strips then performing a rotation relative to each other.

---

It has been found that it is possible with the aid of such a control cable to transmit not only large pulling forces to the member to be controlled but also large pushing forces. A great advantage of the control cable is the flexibility thereof.

The present invention relates to a flexible control cable for mechanically operating on members that are located at a distance from the place of operation. The control cable according to the invention consists of a pair of strips which are helically wound together and one of which, the guide strip, is adapted to be fixed axially at the ends thereof, whereas the other, the control strip, extends at both ends beyond the guide strip and is adapted to be displaced axially relative thereto, the strips performing then a rotation relative to each other.

It has been found, surprisingly enough, that it is possible with the aid of such a control cable to transmit not only large pulling forces to the member to be controlled but also large pushing forces directed from the controlling member towards the controlled member. A great advantage is that the control cable is easily flexible. If required, the desired flexibility can be improved by making the guide strip and/or the control strip laminated. A further advantage is that neither the guide strip nor the control strip stretches when the cable is bent, so that not even a pronounced bending of the cable leads to any relative motion between control strip and guide strip. In comparison with the known Bowden-type of cable, the guide sleeve of which is well known to stretch upon bending, the present control cable also has the essential advantage of being cheaper in manufacture and of operating with less friction and therefore more efficiently.

In a particularly advantageous embodiment of the control cable according to the invention, rotatable couplings are provided at the ends of the control cable to prevent a possible rotation of the control cable owing to the axial displacement thereof from being transferred to the control member or the like or to the controlled member at the far end.

To support laterally the terminal portions of the control strip extending beyond the ends of the helically wound guide strip, prolongation sleeves may be provided for the latter to accommodate the helically wound control strip. These sleeves can preferably at the same time serve to guide piston-shaped prolongations of the control strip serving to connect the latter with the control member or with the member to be controlled.

Other characteristic features and advantages of the invention will be apparent from the following detailed description of a number of embodyments.

FIG. 1 shows a complete control mechanism comprising a control cable according to the invention.

FIG. 2 shows on an enlarged scale an axial section through the transfer mechanism connected to one end of the cable.

FIG. 9 shows a complete control mechanism of a modified type.

FIG. 10 shows in partially longitudinal section the transfer mechanism at the far end of the cable.

FIG. 11 shows a pair of control cables operated by a common control member.

Figure 3:
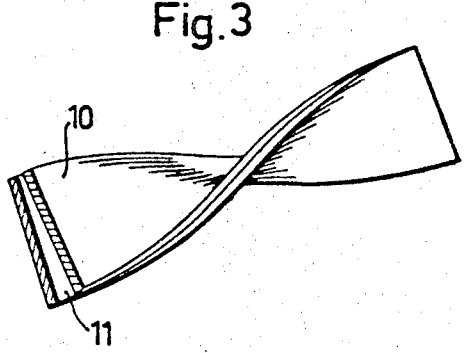
FIG. 3 shows a portion of the control cable on a still larger scale.

In FIGS. 1–3 reference numbers 10 and 11 designate a pair of strips of rectangular cross section which are wound together in helical form. The strips may consist of spring-steel, plastic or some other rigid but elastically flexible material, the strips being slidable on each other with a certain amount of play and the scope of the pitch being selected in such a way that one strip is slidable axially within the other, a simultaneous rotation being possible. The strip 10, the guide strip, is adapted to be fixed at both of its ends, whereas the other strip 11, the control strip, is adapted to be attached, possibly rotatably, to a handle or some other control member and at the other end, also possibly rotatably to the valve or other member to be adjusted by sliding movement of the control strip. An embodiment of suitable mechanisms for this purpose are shown in FIGS. 1 and 2. As is apparent particularly from FIG. 2, the two strips 10 and 11 are inserted at the far end into a sleeve 13 which is fastened to a bracket 14 by means of a nut 15. From the opposite end there is inserted into the sleeve 13 a prolongation tube 16 having the same inner diameter as the sleeve. One end of the guide strip 10 is bent over and inserted and held in position by the pressure exerted between the prolongation tube and the sleeve. In the tube 16 a rod 17 is rotatable and axially displaceable, the inner end thereof being attached to one end of the control strip 11. A sleeve 18 is telescopically slidable on the tube 16 and is coupled to the outer end of the rod 17 rotatably but without axial displacement by means of an axial ball bearing 19 which is held in position between an interior shoulder of the sleeve and a nut 20 screwed into the same. A threaded pin 21 extending from the nut serves to connect the sleeve with the member to be controlled.

At the control end, the two strips 10 and 11 are attached to a mechanism corresponding to that of FIG. 2, except that there is no counterpart to the threaded pin 21. Instead, the sleeve 18 serves as an actuating member to be gripped by hand.

The operation of the arrangement shown will be clear from the above. If the handle 18 shown in FIG. 1 is pushed to the left on the fixed tube 16, the rod 17 is displaced by an equal amount within the tube and pushes the control strip 11 axially with simultaneous rotation thereof within the fixed guide strip 10, imparting the same motion to the rod 17 within the tube 16. At the far end the strip 11 is pushed the same distance into the fixed tube 16 together with the rod 17 which in its turn pushes the sleeve 18 without rotation thereof. An axial displacement of the handle 18 therefore causes an exactly equal displacement of the sleeve 18 at the far end, the presence of the ball bearings 19 preventing any rotation from being transferred from the control strip 11.

Figure 4:
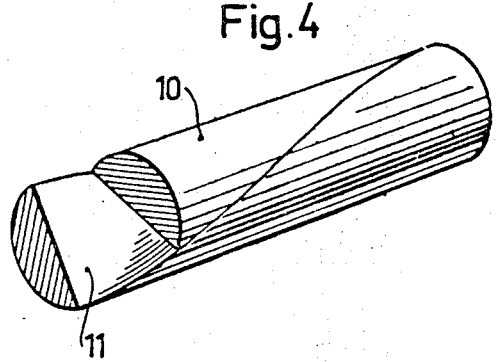
FIGS. 4–8 show in a manner similar to FIG. 3 modified forms of the control cable.

As shown in FIG. 4, the two strips 10 and 11 are of semi-circular cross section, forming together a cable-like device of circular cross section.

Figure 5:
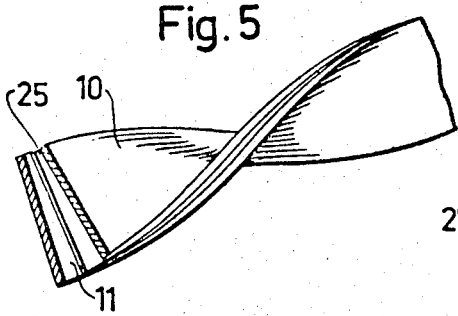

FIG. 5 shows the modified embodiment comprising a helically wound strip 25 of Teflon or the like, which is inserted between the guide strip 10 and the control strip 11 and serves to reduce friction therebetween. It is preferable for the strip 25 to be fixed relative to the guide strip 10.

Figure 6:
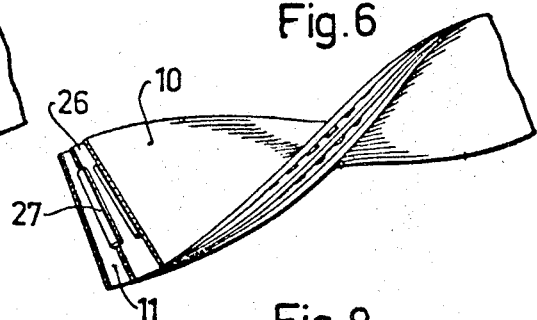
Figure 7:
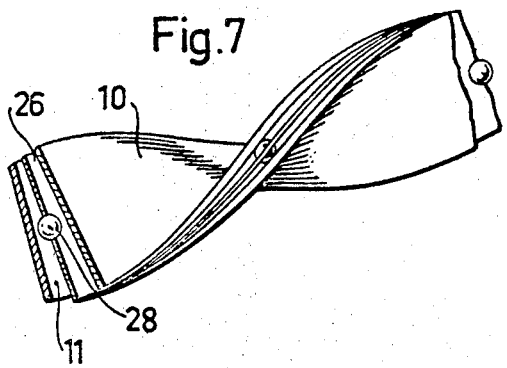

FIG. 6 shows an interposed helically wound strip 26 serving as a holder for rollers 27, which reduce the friction. In a similar manner FIG. 7 shows a strip serving as a holder for balls 28.

Figure 8:
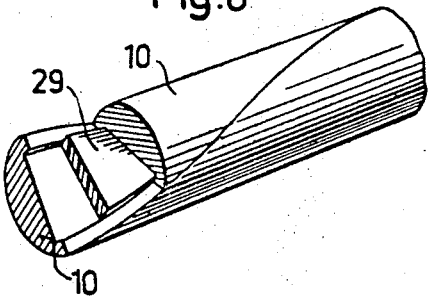

FIG. 8 shows a rectangular control strip 29 positioned in the flat recesses provided in the surfaces of a pair of helically wound guide strips 10 of semi-circular cross section, which enclose the control strip between them.

In the embodiment of FIGS. 9 and 10 the transfer mechanisms at the ends of the strips 10 and 11 is of a modified type. At the control end, a guide tube 16 is provided similarly to FIGS. 1 and 2 and is attached with the aid of sleeve 13 and a nut 15 to a bracket 14. A piston 32 is slidable within the tube 16 and has provided therein an axial threaded boring 33. Screwed into the boring from outer end is a hook 34, the angular part of which is rotatably connected to a control arm 36 of a valve 35, whereas a screw 37 is inserted from the other end and is fixedly attached to the control strip 11. It is apparent that, since the piston 32 cannot rotate within the tube 16, the rotation of the control strip upon displacement thereof relative to the guide strip will cause the screw 37 to be screwed into or out of the piston. At the actuating point, the control strip 11 is attached to a screw 38, having the same pitch as the screw 37 and which is inserted in a threaded boring in a slide 39. The slide is reciprocable within a housing 40, to which an end of the guide strip 10 is attached and has provided on the upper surface thereof teeth 41 engaging a tooth wheel 42, which can be turned by means of a control wheel 43. A certain axial displacement of the slide 39 will result in an equal amount of axial displacement of the piston 32, since the rotation of the control strip 11 will cause the screw 37 to move into the piston 32 the same amount as the screw 38 moves outwardly of slide 39, or vice versa.

FIG. 11 shows two pairs of helically wound strips 10, 11 and 10', 11', the control strip 11 and 11' being wound together at one end and attached to a mantle 44, which is rotatably and axially inserted into a sleeve 45. The sleeve is attached to a plate 46, whereas the guide strips 10 and 10' have their ends threaded into the plate 46. Fastened to the end of the mantle 44 is a wheel 47, rotation of which causes the control strips 11 and 11' to rotate equal amounts relative to their corresponding guide strips 10 and 10', a simultaneous axial displacement taking place. Either the rotational or the axial displacement can be utilized at the far ends of the control strips for displacing or adjusting the desired members to be controlled.

Figure 12:
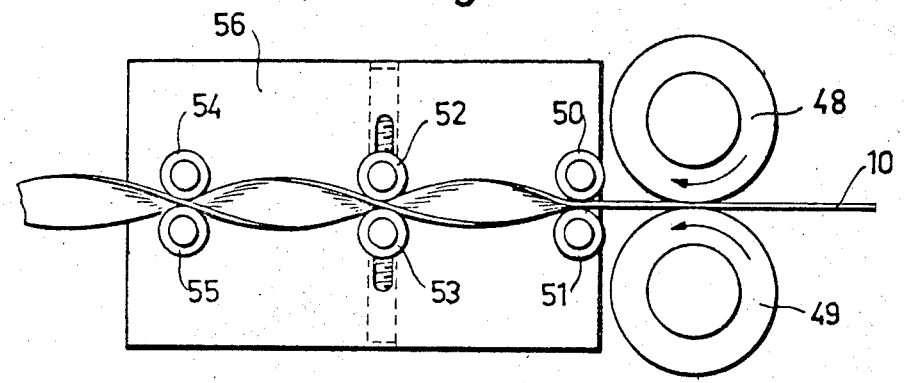
FIGS. 12–14 show schematically a machine for winding a strip forming part of the control cable into helical form.
Figure 13:
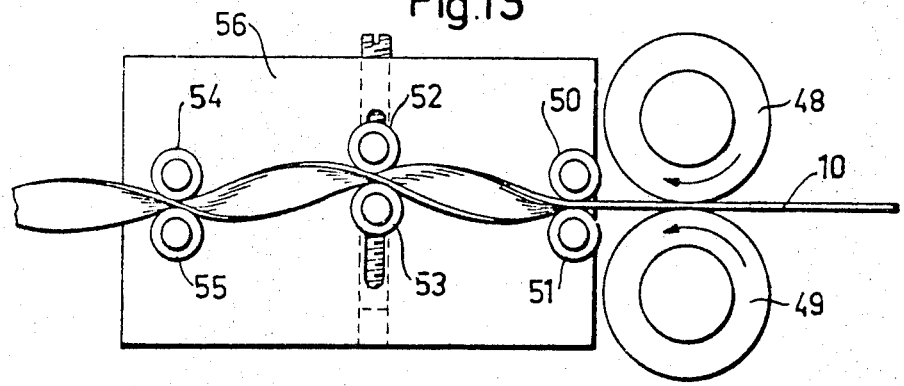
Figure 14:
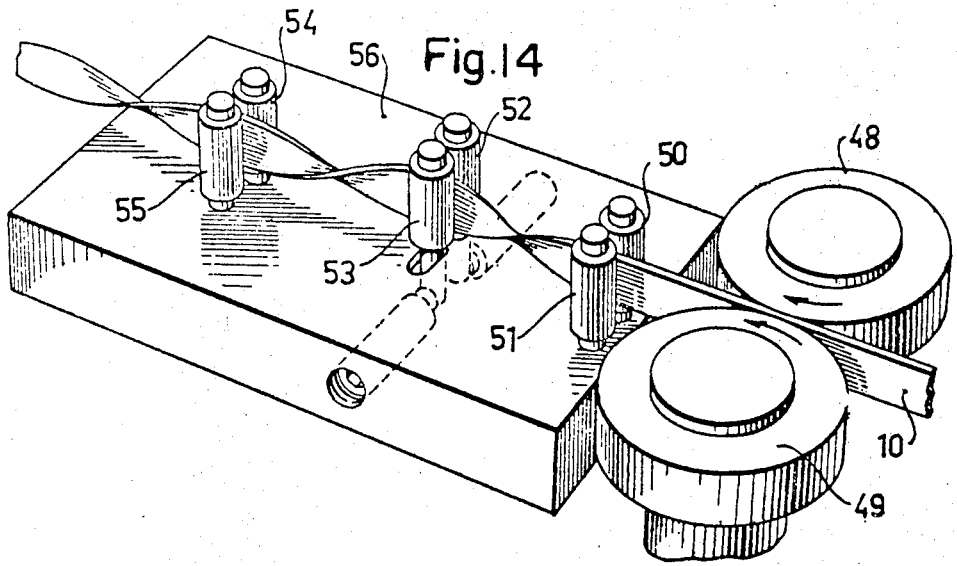

FIGS. 12 to 14 show schematically a machine for winding the strips into helical form. A flat strip 10 is introduced between a pair of guide rollers 48 and 49 and then between a first pair of pressure rollers 50, 51, which is followed by a 180° rotation, upon which there is a second pair of pressure rollers 52 and 53. After an additional half revolution of the strip, there is a third pair of pressure rollers 54 and 55. The pressure rollers are mounted on a common ground plate 56. The intermediate pair 52, 53 is midway between the first and the third pairs. The spacing between the pairs of rollers determines the pitch of the helical strip. The spacing between the rollers of a pair can be adjusted to accommodate the thickness of the strip and the intermediate pair is also displaceable perpendicularly to the strip, as indicated in FIG. 13. By a suitable selected displacement of the intermediate pair of rollers 52, 53 from the middle position, any desired play between the guide and the control strip can be obtained. Some amount of play is always required to prevent the strips from jamming.

An embodiment of the control cable may comprise a guide strip which is rotatable and axially fixed, whereas the control strip is axially displaceable without rotation. This embodiment has the advantage of not requiring a rotatable coupling between the control strip and the member to be controlled. Instead, the control strip can be attached direct to the displaceable member, which does not have to be rotatable. Axial ball bearings may be provided at the ends of the guide strip for taking up axial forces.

The invention is not limited to the embodiments described, various modifications being possible within the scope of the invention. The strips do not have to be of metal, but one or both may be of other material, such as a plastic. Also, the strips do not have to be solid but can be laminated to provide increased flexibility.

What I claim is:

1. Control cable characterized by a pair of strips wound together one within the other into helical form and one of which, the guide strip, is adapted to be axially fixed, whereas the other, the control strip, is adapted to be axially displaceable along the guide strip.

2. Control cable according to claim 1, characterized in that the ends of the helically wound control strip, extend beyond those of the helically wound guide strip.

3. Control cable according to claim 1, characterized in that the two strips have rectangular cross sections.

4. Control cable according to claim 1, characterized in that the two strips are of semi-circular cross section.

5. Control cable according to claim 1 characterized in that friction-reducing means are inserted between the two strips.

6. Control cable according to claim 5, characterized in that the strip of Teflon or other material of low friction relative to the material of the control- or guide strip is inserted between the strips.

7. Control cable according to claim 5, characterized in that a number of balls or rollers as well as a helically wound strip serving as a holder for the same is inserted between the control strip and the guide strip.

8. Control cable according to claim 1, characterized by a pair of helically wound guide strips, preferably of semi-circular cross section, and provided in the adjacent surfaces thereof with longitudinal recesses for accommodating the control strip.

9. Control cable according to claim 8, characterized in that the longitudinal recesses are substantially rectangular in cross section, so as to accommodate a control strip of rectangular cross section.

10. Control cable according to claim 1 characterized in that the control and/or guide strip is laminated.

11. Control mechanism comprising a control cable according to claim 1 characterized by a rotatable coupling provided between the control strip and a control member, such as a handle or the like.

12. Control mechanism according to claim 11, characterized in that the rotatable coupling comprises an axial bearing.

13. Control mechanism according to claim 11, characterized in that one of the rotatable members, the rotatable coupling, is a bolt and the other member is a nut engaging the bolt.

14. Control mechanism according to claim 13, characterized by a rotatable coupling comprising a bolt and a nut provided at each end of the control strip the two bolts having the same pitch.

15. Control mechanism comprising a control cable according to claim 1 characterized in that the control strip is fixedly attached at least at one end thereof to a sleeve adapted to laterally support the terminal portions of the control cable or a rod-shaped prolongation thereof.

16. Control cable according to claim 1, characterized in that the guide strip is rotatable about its axes and adapted to be fixed in the axial direction, the control strip being axially displaceable without rotation.

17. Control cable according to claim 16, characterized by a bearing and a pair of mutually rotatable members, one of which is fixed and the other of which is attached to the guide strip.

References Cited

UNITED STATES PATENTS

| 2,209,194 | 7/1940 | Deutsch | 74—110 |
| 2,901,914 | 9/1959 | Preston | 74—110 |

FOREIGN PATENTS 1,134,222   11/1956   France.

WESLEY S. RATLIFF, Jr., Primary Examiner

U.S. Cl. X.R.

74—501